June 5, 1962 — V. PISCITELLI — 3,037,825
DEVICE FOR REMOVING GREASE FROM BEARINGS
Filed June 28, 1960

*INVENTOR.*
VINCENT PISCITELLI
BY *James R. Campbell*
ATTORNEY

United States Patent Office 3,037,825
Patented June 5, 1962

3,037,825
DEVICE FOR REMOVING GREASE FROM BEARINGS
Vincent Piscitelli, Schenectady, N.Y., assignor to General Electric Company, a corporation of New York
Filed June 28, 1960, Ser. No. 39,334
2 Claims. (Cl. 308—187)

The invention described herein relates to bearings and more particularly to an improved method and means for lubricating bearings used in large rotating equipment.

Motors and generators ranging in size to several hundred horsepower, compressors and other rotating machinery, conventionally utilize bearings lubricated with grease, rather than liquid lubricated bearings. A major disadvantage of grease lubricated bearings is that provision is not made for purging old grease from the bearing housing during the time when new grease is being added to the bearing. In one conventional design, the bearing is packed with a sufficient mass of grease to permit service for a predetermined number of hours or for a time period in terms of years where the machine operation is intermittent. When the stated time period has elapsed and time for grease renewal occurs, it is necessary to dismantle the equipment to remove the old grease and pack in the desired amount of new grease. The disadvantage is that the machine must be dismantled for repacking the bearings with grease. Moreover, it is not possible to determine how much grease is in a bearing at any particular time and the equipment must be shut down, with consequent loss of production, during the time required for repacking of the bearings.

Other types of bearings utilize a fitting for the introduction of grease into the bearing cavities, but no means are provided for purging the bearings of grease during the time that the new grease is being added. One shortcoming of this design is that the relatively slight pressure used for forcing grease into the bearing housing is often great enough to cause grease to migrate axially of the shaft into the operating parts of the machine and in the opposite direction outwardly of the machine. The damage by grease to insulation and the electrical operating components of the machine is well known. Also, in the event an excessive amount of grease is packed in the bearing cavity, the balls of the bearing cannot move in an unimpeded manner and therefore create a shearing action on the various layers of grease such that overheating of the bearing takes place. This condition continues until the bearing purges itself of an amount of grease sufficient to permit bearing operation.

In still another modification, a tube is placed in the wall of a bearing housing and as grease is introduced through a fitting, the new grease will appear in the tube so that it can be inspected upon removal to determine whether a proper mixing of old and new grease is taking place within the bearing housing.

In view of the above, it is evident that the need exists for a bearing arrangement wherein new grease can be introduced at any time convenient to an operator while simultaneously purging the bearing of old grease. After regreasing the bearing should contain an optimum amount of grease and migration of grease along the shaft should be minimized.

The primary object of my invention therefore is to provide a simple, inexpensive device capable of quick attachment to a bearing housing for positively indicating when the desired amount of new grease has been added to the bearing.

In carrying out my invention, I eliminate the disadvantages of the prior art and satisfy the need stated above by inserting a hollow tube in the wall of a bearing housing such that it has access to the area in which the bearing operates. A spiralled rod is positioned within the hollow tube so that when new grease is added to the bearing, the rod can be withdrawn, carrying with it, old grease from the bearing. It will be evident that when the rod is reinserted in the hollow tube, with the continued application of grease, the new grease will gravitate into the hollow tube and its appearance on the spiralled rod will serve as a clear indication of the fact that the bearing has been purged completely of old grease and refilled with new grease.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

Figures 1, 2:
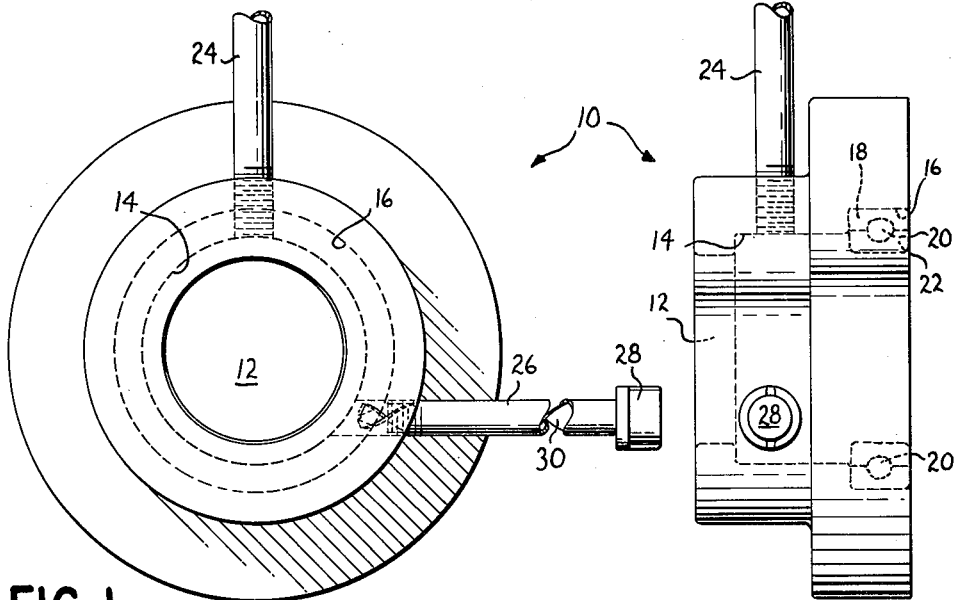
FIGURE 1 is an end view in elevation of the end of a bearing illustrating the position of a spiralled rod in the bearing housing wall.
FIGURE 2 is a side view of the bearing shown in FIGURE 1.
Figure 3:
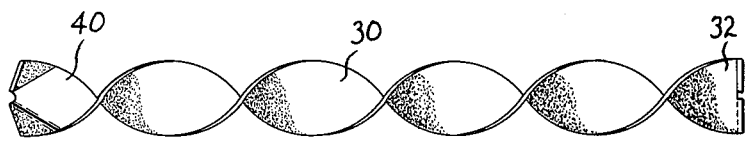
FIGURE 3 is a view of a spiralled rod used with the invention.

Referring to the drawings wherein like reference characters designate like and corresponding parts throughout the several views, there is shown a bearing housing 10 for a totally enclosed fan cooled electric motor, not shown. The housing includes an opening 12 through which a shaft is adapted to extend and as shown in FIGURES 1 and 2, the housing is stepped at 14 and 16. The step 16 is designed to accept the outer race 18 of a ball bearing which includes balls 20 and an inner race 22. Grease is introduced into the bearing cavity 12 through a fitting 24 which may consist of any one of a number of devices designed especially for this purpose.

Figure 4:
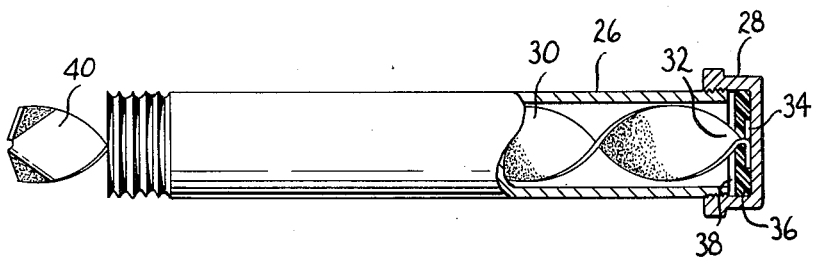
FIGURE 4 illustrates the arrangement of the spiralled rod in a hollow tube designed for insertion in the wall of a bearing housing.

In order to effect removal of the grease from the bearing cavity, a hollow tube 26 is screwed into the wall of the bearing housing 10, preferably below the shaft centerline, and is equipped with screw threads on its other end for receiving a cap 28. A spiralled loading rod 30 consisting of a section of stainless steel material twisted to form a spiral and made of a width only slightly less than the inner diameter of the hollow tube 26 is positioned within the hollow tube as illustrated in FIGURE 4. In order to preclude the spiralled rod from moving into contact with the operating parts of the bearing or the shaft, the outer end 32 of the shaft is equipped with a T-shaped member 34 which is designed to rest against the inner surface of the cap 28. A polyester or epoxy resin 36 then is poured into an end of the cap and a washer 38 bonded to the resin so as to firmly lock the spiral to the cap 28.

In operation, new grease may be introduced into the bearing through tube 24 either while the motor is running or at standstill. While grease is being added to the bearing or after the addition is made, the spiralled rod 30 is rotated in a counter-clockwise direction without changing its longitudinal position in the tube. Since the end 40 of rod 30 extends beyond the end of tube 26 and into the bearing cavity as shown in FIGURE 2, it will be evident that the grease will be moved along the length of the spiralled rod and into the tube. When it is believed that the rod is loaded with grease, it may be removed, cleaned and re-inserted if new grease does not appear on the rod. As soon as new grease does appear along the rod length, the operator will know that the bearing has been completely regreased. An important advantage derived from gerasing during the time the machine is in operation is that removal of grease by the rod, prevents a pressure from being established in the bearing cavity which might cause migration of grease along the shaft into the operating parts of the machine.

When the regreasing operation is complete, the cap 28 may be screwed tightly on to the end of tube 26 until such time as the process must again be repeated.

Although a specific embodiment has been disclosed, it will be evident that many different designs will be apparent to those skilled in the art. The tube may be located at any position around the bearing housing and it and the rod may be made of any material compatible with grease and the vibrations established by operating machinery, such as motors, compressors, and the like. Obviously, the rod need not be spiralled along its complete length and the end or loading tip 40 need only be of a design which will pick up grease and cause it to move into the tube.

It will be apparent that vibration will cause grease to move into the tube. Therefore, a section of rod or ribbon may be used in the tube for agitating or vibrating the grease. This reduces the internal friction and causes its movement along the rod into the tube.

It will be apparent that many modifications and variations are possible in light of the above teachings. It therefore is to be understood that within the scope of the appended claims the invention may be practiced otherwise than as specifically described.

What I claim as new and desire to secure by Letters Patent of the United States is:

1. A device for regreasing bearings comprising a bearing housing having a bearing therein, a fitting on said housing for introducing new grease into a cavity surrounding said bearing, a tube in a wall of the bearing housing and having communication with said cavity, and a spiralled rod in said tube having a diameter only slightly less than the tube inner diameter, said rod being of a length sufficient to extend into the bearing cavity and effective in removing old grease from the cavity simultaneously with the introduction of new grease therein.

2. A device for regreasing bearings comprising a bearing housing having a ball bearing located in a cavity therein, a fitting on the housing for filling the cavity with grease, and a device on the housing for removing grease from the bearing either separately or concurrently with the addition of new grease, said device comprising a hollow tube connected with said housing and a loading rod in said tube having a diameter slightly less than the tube inner diameter and having an end thereof terminating in said cavity so that when the loading rod is actuated, the grease is caused to migrate into the tube.

References Cited in the file of this patent
UNITED STATES PATENTS

| | | |
|---|---|---|
| 2,164,449 | Delaval-Crow | July 4, 1939 |
| 2,548,644 | Wightman | Apr. 10, 1951 |
| 2,770,507 | Ehnts | Nov. 13, 1956 |